(12) United States Patent
Padget et al.

(10) Patent No.: US 10,137,548 B2
(45) Date of Patent: Nov. 27, 2018

(54) FOOT ATTACHMENT FOR PNEUMATIC ROTARY TOOLS

(71) Applicants: Robert Bosch Tool Corporation, Broadview, IL (US); Robert Bosch GmbH, Stuttgart (DE)

(72) Inventors: Bradley D Padget, Huntley, IL (US); Daniel Blythe, Jr., Arlington Heights, IL (US); Kevin Wasielewski, Downers Grove, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 402 days.

(21) Appl. No.: 14/984,002

(22) Filed: Dec. 30, 2015

(65) Prior Publication Data

US 2016/0184948 A1    Jun. 30, 2016

Related U.S. Application Data

(60) Provisional application No. 62/098,783, filed on Dec. 31, 2014.

(51) Int. Cl.
*B23Q 11/00* (2006.01)
*B25F 5/02* (2006.01)
*B23Q 5/06* (2006.01)

(52) U.S. Cl.
CPC ............ *B23Q 11/0071* (2013.01); *B23Q 5/06* (2013.01); *B23Q 11/0046* (2013.01); *B25F 5/02* (2013.01)

(58) Field of Classification Search
CPC .. B23Q 11/0071; B23Q 5/06; B23Q 11/0046; B25F 5/02

USPC ............... 173/198; 409/134, 135, 137, 182; 144/252.1; 408/67; 451/451

See application file for complete search history.

(56) References Cited

U.S. PATENT DOCUMENTS

| | | | | | |
|---|---|---|---|---|---|
| 4,058,936 A | * | 11/1977 | Marton | ................. | B24B 55/102 |
| | | | | | 451/359 |
| 4,245,437 A | * | 1/1981 | Marton | ................. | B24B 55/102 |
| | | | | | 451/456 |
| 4,281,457 A | * | 8/1981 | Walton, II | ............... | A61F 15/02 |
| | | | | | 30/124 |
| 5,772,367 A | * | 6/1998 | Daniel | ............... | B23Q 11/0046 |
| | | | | | 173/75 |
| 6,146,066 A | * | 11/2000 | Yelton | ................ | B23Q 11/0046 |
| | | | | | 144/252.1 |
| 7,094,138 B2 | * | 8/2006 | Chang | ..................... | B24B 55/10 |
| | | | | | 451/359 |
| 7,510,356 B2 | * | 3/2009 | Colon | ..................... | B23B 51/12 |
| | | | | | 408/1 R |

(Continued)

*Primary Examiner* — Nathaniel Chukwurah
(74) *Attorney, Agent, or Firm* — Maginot Moore & Beck LLP

(57) ABSTRACT

A foot attachment for a pneumatic rotary tool is configured to be attached to a nose portion of the housing of the tool. The rotary tool includes a housing that defines an air flow channel. A nose portion of the housing defines an air flow inlet for the air flow channel. The foot attachment includes a shroud portion that extends from the nose portion of the housing and surrounds a working space in front of the nose portion of the housing. The shroud portion defines at least one tangential opening that directs air flow into the shroud portion along a tangent such that a vortex is generated within the working space.

14 Claims, 2 Drawing Sheets

(56) References Cited

U.S. PATENT DOCUMENTS

2007/0264092 A1* 11/2007 Kesten ............... B23Q 11/0046
408/67

* cited by examiner

FOOT ATTACHMENT FOR PNEUMATIC ROTARY TOOLS

CROSS-REFERENCE TO RELATED APPLICATIONS

This application claims priority to U.S. Provisional Application Ser. No. 62/098,783 entitled "FOOT ATTACHMENT SYSTEM FOR USE WITH A ROTARY TOOL AND METHOD THEREOF" by Padget et al., filed Dec. 31, 2014, the disclosure of which is incorporated herein by reference in its entirety.

TECHNICAL FIELD

The disclosure relates generally to power tools, and more particularly to rotary tools having a foot attachment system.

BACKGROUND

In general, rotary power tools are light-weight, handheld power tools capable of being equipped with a variety of accessory tools and attachments, such as cutting blades, sanding discs, grinding tools, and many others. These types of tools typically include a generally cylindrically-shaped main body that supports a drive mechanism and often serves as a hand grip for the tool as well. The drive mechanism includes an output shaft that is equipped with an accessory attachment mechanism, such as a collet, that enables various accessory tools to be releasably secured to the power tool.

Accessory tools for rotary power tools typically have a work portion and a shank. The work portion is configured to perform a certain kind of job, such as cutting, grinding, sanding, polishing, and the like. The shank extends from the work portion and is received by an accessory attachment system on the power tool. The accessory attachment mechanism holds the shank in line with the axis of the output shaft so that, when the output shaft is rotated by the motor, the accessory tool is driven to rotate about the axis along with the output shaft.

Some rotary tools, however, are incapable of collecting dust and debris when the user is performing a cutting operation. Certain tasks, such as following an outline on the work surface, that require accuracy and/or precise positioning of the tool in relation to the work surface make it difficult to perform.

What is needed is a system incorporated into the rotary tool that can eliminate the dust without impeding tool performance, visibility of working area, usage of tool, and post job cleanliness of working area.

DRAWINGS

DETAILED DESCRIPTION

Figure 1:
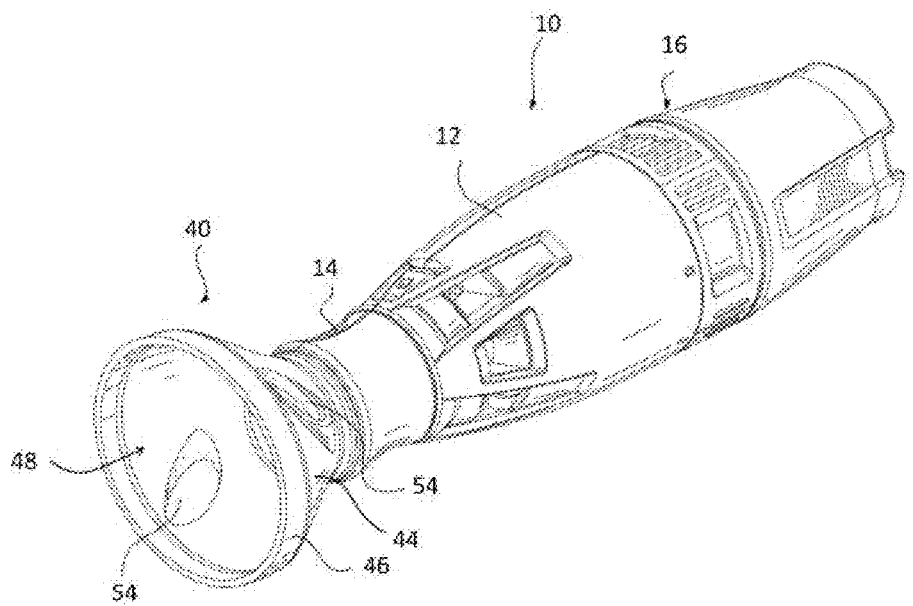
FIG. 1 is a perspective view of a rotary tool having a foot attachment system according to the disclosure.

For the purposes of promoting an understanding of the principles of the invention, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normallys occur to one of ordinary skill in the art to which this disclosure pertains.

The disclosure is directed to a foot attachment system for use with a pneumatically-powered tool, and, in particular a vacuum-powered rotary tool or similar type of tool, which utilizes a flow of fluid such as air, oxygen, or the like to allow air to flow in the air flow channel from the front of the foot attachment system toward the tool housing. The foot attachment provides a cutting guide surface which can be used to control the depth of cuts performed by a cutting tool. Because the tool is vacuum powered, a vacuum functionality is built into the tool that can be used to implement a dust collection system for the rotary tool to improve the visibility and the post job cleanliness of the work area. In accordance with the present disclosure, the foot attachment is configured to improve the efficiency the dust collection system by generating a beneficial air flow in the area where the working tool engages a workpiece and dust is produced.

Figure 2:
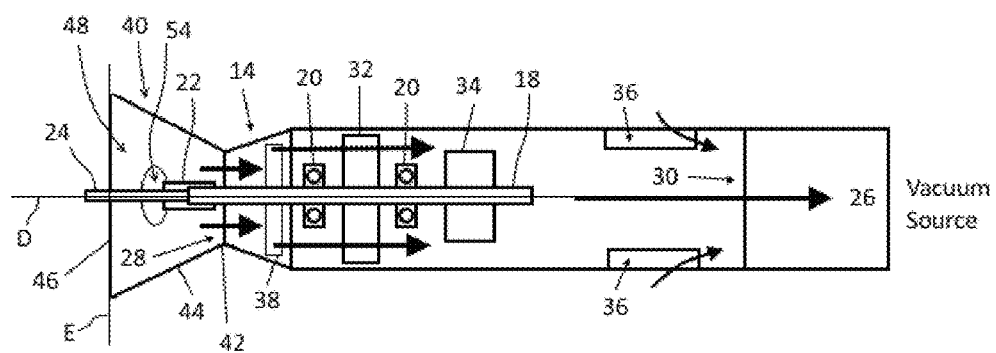
FIG. 2 is a schematic illustration of the rotary tool of FIG. 1.

Referring now to FIGS. 1 and 2, an embodiment of a pneumatic power tool 10 having a foot attachment in accordance with the present disclosure is depicted. The tool 10 includes a generally cylindrically shaped housing 12 having a nose portion 14 and a main body portion 16. The housing may be constructed of a durable material, such as plastic, metal, or composite materials such as a fiber reinforced polymer. A pneumatic drive system is enclosed within the main body portion 14 of the housing 12. The drive system includes an output shaft 18 that is rotatably supported within the housing in bearings 20. The output shaft 18 extends through the nose portion 14 of the housing. A tool holder 22, such as a collet, is provided on the end of the output shaft 18 and is accessible at the nose portion 14 of the housing. The tool holder 22 is configured to retain the shank of a working tool 24, or accessory tool.

The drive system is configured to utilize a fluid flow, e.g., air, gas, oxygen, to rotate the output shaft 18. The housing 12 defines at least one air flow inlet 28, at least air flow outlet 30, and at least one air flow channel within the housing that connects the air flow inlet(s) and the air flow outlet(s). The housing is configured to be connected to an air flow generator for generating a flow of air in the channel. In the embodiments described herein, the tool 10 is configured to utilize a fluid flow source that comprises a vacuum 26. The fluid outlet 30 is configured to be connected to the vacuum 26 such that a fluid flow is generated in the channel of the housing 12 in the direction indicated by the arrows from the inlet 28 to the outlet 30.

The drive system may include a stator 38 which is a stationary element in the housing that is configured to guide air flow along one or more paths within the housing. The drive system may also include a rotor assembly 32 mounted onto the output shaft 18 that is configured to use the fluid flowing through the channel to rotate the output shaft 18. In the embodiment of FIG. 1, the rotor assembly 32 comprises at least one fan, e.g., a turbine fan, mounted onto the output shaft 18 in a rotationally fixed manner.

To control the speed of rotation of the output shaft, the pneumatic drive system may include a speed limit mechanism 34, such as a centrifugal governor. The speed limit mechanism 34 is used to limit the rotation speed of the output shaft 18 to a predetermined level. For example, in the presence of an air flow generated by a standard vacuum cleaner, a rotor assembly with one or more turbine fans can cause an output shaft 16 to rotate at speeds up to 60,000 rpm. This speed may exceed the speed rating for certain components and accessories that are used in/on the tool. For example, many accessory tools for use with rotary power tools have a speed rating of 35,000 rpm (not to exceed). The speed limit mechanism 34 may be configured to limit the rotation speed of the output shaft 18 to a speed that is within or does not exceed this speed rating. However, in practice, the speed limit mechanism 34 may be configured to impose substantially any desired speed limit on the tool.

The speed limit mechanism 34 may be configured to limit the rotation speed of the output shaft 18 in any suitable manner. In one embodiment, the speed limit mechanism 34 comprises a centrifugal governor, such as a flyball type governor, as are known in the art which can be configured to open one or more bypass vents 36 in the housing to decrease the flow of air in the housing channel depending on the rotation speed of the output shaft.

Figure 3:
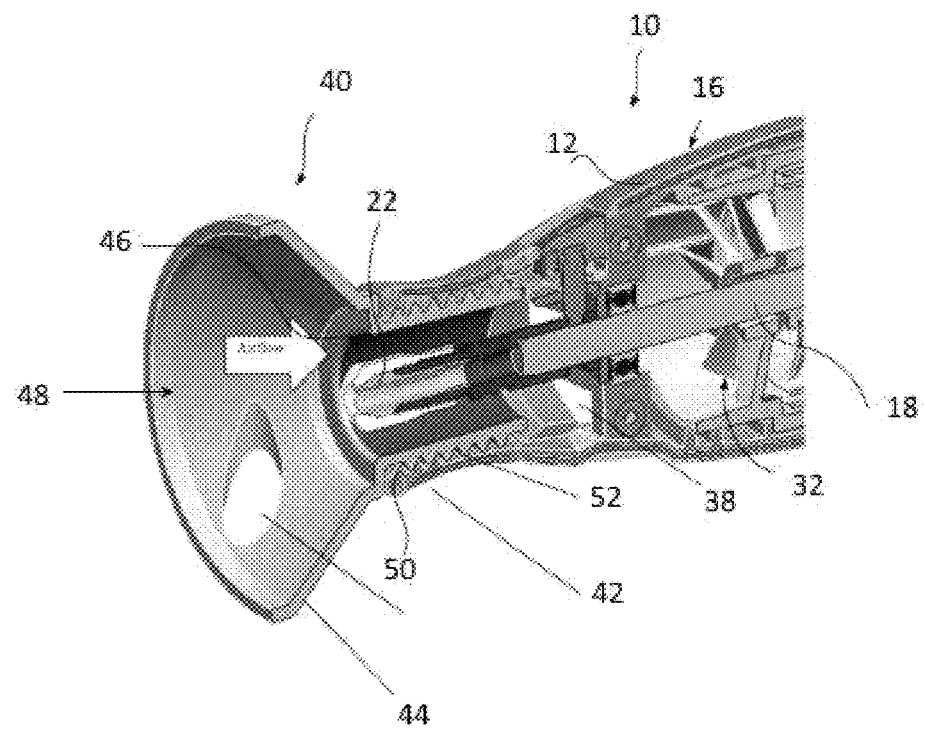
FIG. 3 depicts a cross-sectional view of the rotary tool of FIG. 1 showing the foot attachment system in greater detail.

The foot attachment 40 for the rotary tool is constructed of a durable material, such as plastic, metal, or composite materials such as a fiber reinforced polymer and includes an attachment portion 42, a shroud portion 44, and a guide portion 46. The attachment portion 42, shroud portion and guide portion may be formed integrally as part of a single body, e.g. by injection molding. The attachment portion 42 is configured to be releasably/removably attached to the nose portion 14 of the housing. The attachment portion 42 may comprise a collar that is configured to be installed around the nose portion of the housing. In one embodiment, the attachment portion 42 comprises an internal thread structure 50 that is configured to threadingly engage an external thread structure 52 provided on the nose portion 14 of the housing as depicted in FIG. 3. Of course, the attachment portion 42 may be attached to the nose portion in any suitable manner.

The shroud portion 44 comprises a wall that extends generally forwardly from the attachment portion 42 and surrounds the working space 48. As used herein, the "working space" refers to the area right in front of the nose portion of the housing where the working tool engages a workpiece to perform work, such as cutting, grinding, polishing, and the like. In the embodiment of FIGS. 1-4, the shroud portion 44 has a funnel-like shape that tapers inwardly toward the nose portion 14 of the housing and flares outwardly as it extends away from the nose portion. The guide portion 46 of the foot attachment comprises the leading edge of the shroud portion 44. The leading edge has a generally circular shape and is generally flat such that the leading edge lies substantially in a single plane E that is perpendicular to the drive axis D of the tool 10 (FIG. 2).

The guide portion 46 of the foot attachment 40 is configured to be placed against a surface of a workpiece and to provide depth control for cutting and grinding. In one embodiment, at least a portion of the shroud 44 includes a transparent material, such as plastic or glass, to allow a user of the tool to view a cutting element, such as a bit, when the guide portion 46 of the foot attachment 40 is positioned on a workpiece, thus allowing the user to properly guide the working tool along a desired cut line. In one embodiment, the entire foot attachment is formed of a transparent plastic material.

The shroud portion 44 of the foot attachment 40 includes at least one tangential air flow inlet 54 configured to generate a swirling air flow, or vortex, within the working space enclosed by the shroud portion. During operations when a vacuum source is attached to the tool, a flow of air is generated through the housing that is drawn into the housing via the air flow inlet 28 and exits the housing via the air flow outlet 30. The air flow inlet 28 is in fluid communication with the working space 48. Therefore, the air is drawn into the housing from the working space. When the guide portion 46 of the foot attachment 40 is positioned in contact with a surface, air enters the working space 48 primarily via the tangential air flow inlets 54 in the shroud portion 44 to replace the air drawn into the housing via the air flow inlet 28.

Figure 4:
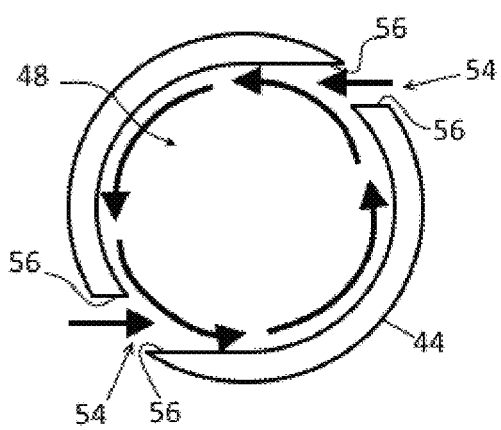
FIG. 4 is a schematic depiction of the tangential air flow into the shroud portion of the foot attachment of FIGS. 1-3.

As can be seen in FIG. 4, the tangential air flow inlets are defined in the wall of the shroud portion by baffle surfaces 56 that are oriented to direct air flow into the working space in a direction that is substantially tangent with respect to the inner surface of the shroud 44. This results in a swirling air flow, or vortex, in the working space 48 which can pick up dust and draw the dust into the air flow channel in the housing. The dust is drawn into the housing via the air flow inlet and exits the housing via the air flow outlet which leads to a vacuum receptacle (not shown), such as a vacuum bag. As a result, the working space is kept clean and visibility of the tool in the work area is increased as the tool is being operated. As can be seen in FIGS. 1 and 4, two tangential air flow inlets 54 may be provided on opposite sides of the shroud portion for generating the vortex. In alternative embodiments, a single tangential air flow opening or more than two tangential air flow openings may be used.

In one embodiment, the tangential air flow inlets are configured to cause rotational air flow in the same rotational direction as the air flow guided by the stator 38. As a result, less energy may be required to pull air through the stator 38 which leaves more air flow available to the rotor assembly 32 for a given vacuum which in turn enables more torque to be generated by the rotor assembly.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A vacuum-powered rotary tool comprising:
   a housing having a nose portion and a main body portion, the housing defining at least one air flow channel for guiding a flow of air within the housing, the at least one air flow channel including an air flow inlet located in the nose portion of the housing and at least one air flow outlet located in the main body portion of the housing, the main body portion of the housing being configured to be connected to a vacuum source for generating the flow of air in the at least one air flow channel;
   a pneumatic drive system enclosed within the housing in the air flow channel and including an output shaft, the output shaft having an axis of rotation and including a tool holder that extends from the nose portion of the housing and is configured to retain a working tool, the pneumatic drive system being configured to use the flow of air in the air flow channel to drive the output shaft to rotate about the axis of rotation, the tool holder being configured to rotate with the output shaft and defining a working space in front of the nose portion of the housing where the working tool performs work while being rotated; and
   a foot attachment removably attached to the nose portion of the housing, the foot attachment having a shroud portion, the shroud portion comprising a wall that extends generally forwardly from the nose portion of the housing in a direction parallel to the axis of rotation and surrounds the working space, the wall having a leading edge, the leading edge forming a perimeter around the working space and lying substantially in a single plane that is perpendicular to the axis of rotation, wherein air is drawn into the at least one air flow channel via the air flow inlet in response to the vacuum source generating the flow of air in the at least one air flow channel, wherein the air inlet is in fluid communication with the working space such that the air flow inlet draws air into the at least one air flow channel from the working space, wherein the shroud portion includes at least one tangential air flow inlet for guiding an air flow into the working space from outside of the shroud portion as air is being drawn into the at least one air flow channel via the air flow inlet, and wherein the at least one tangential air flow inlet is configured to generate a vortex within the working space when the flow of air is being generated by the vacuum source.

2. The rotary tool of claim 1, wherein the shroud portion has a funnel shape.

3. The rotary tool of claim 2, wherein the foot attachment includes a first circular end portion that is attached around the nose portion of the housing and a second circular end portion that forms the leading edge, wherein the first circular end portion and the second circular end portion are centered on the axis of rotation, and wherein the second circular end portion has a diameter that is greater than the first circular end portion.

4. The rotary tool of claim 3, wherein the shroud portion tapers from the second circular end portion to the first circular end portion.

5. The rotary tool of claim 4, wherein the nose portion of the housing includes an external thread structure and the first circular end portion includes an internal thread structure that is threadingly engaged with the external thread structure.

6. The rotary tool of claim 1, wherein the shroud portion includes two tangential air inlets located on opposing sides of the working space.

7. The rotary tool of claim 1, wherein the at least one tangential air flow inlet includes at least one baffle surface configured to direct the air flow into the working space, the at least one baffle being configured to direct the air flow into the working space in an air flow direction that defines a tangent substantially with respect to the shroud portion.

8. A rotary tool comprising:

a housing having a nose portion and a main body portion, the housing defining at least one air flow channel for guiding a flow of air within the housing, the at least one air flow channel including an air flow inlet located in the nose portion of the housing and at least one air flow outlet located in the main body portion of the housing, the main body portion of the housing being configured to be connected to a vacuum source for generating the flow of air in the at least one air flow channel;

a pneumatic drive system enclosed within the housing in the air flow channel and including an output shaft configured to rotate about an axis of rotation, the output shaft including a tool holder that extends from the nose portion of the housing and is configured to retain a working tool, the pneumatic drive system being configured to use the flow of air in the air flow channel to drive the output shaft to rotate about the axis of rotation, the tool holder being configured to rotate with the output shaft and defining a working space in front of the nose portion of the housing where the working tool performs work while being rotated; and a foot attachment removably attached to the nose portion of the housing, the foot attachment having a shroud portion that extends generally forwardly from the nose portion of the housing in a direction parallel to the axis of rotation and surrounds the working space, the shroud portion having a leading edge that forms a perimeter around the working space and lies substantially in a single plane that is perpendicular to the axis of rotation, wherein the shroud portion includes at least one tangential air flow inlet for directing air flow into the working space from outside of the shroud portion in a direction that defines a tangent with respect to the shroud portion such that a vortex is generated in the working space as air is drawn into the at least one air flow channel via the air flow inlet.

9. The rotary tool of claim 8, wherein the shroud portion has a funnel shape.

10. The rotary tool of claim 9, wherein the foot attachment includes a first circular end portion that is attached around the nose portion of the housing and a second circular end portion that forms a leading edge of the shroud portion, wherein the second circular end portion has a diameter that is greater than the first circular end portion.

11. The rotary tool of claim 9, wherein the shroud portion tapers from the second circular end portion to the first circular end portion.

12. The rotary tool of claim 11, wherein the nose portion of the housing includes an external thread structure and the first circular end portion includes an internal thread structure that is threadingly engaged with the external thread structure.

13. The rotary tool of claim 8, wherein the shroud portion includes two tangential air inlets located on opposing sides of the working space.

14. The rotary tool of claim 8, wherein the at least one tangential air flow inlet includes at least one baffle surface configured to direct the air flow into the working space, the at least one baffle being configured to direct the air flow into the working space in an air flow direction that defines a tangent substantially with respect to the shroud portion.

* * * * *